(12) United States Patent
Goss et al.

(10) Patent No.: US 9,937,663 B1
(45) Date of Patent: Apr. 10, 2018

(54) METHOD FOR CONTROLLING PRINTING IN THREE-DIMENSIONAL PRINTERS BASED ON NOZZLE CHARACTERISTICS

(71) Applicant: Marvell International Ltd., Hamilton (BM)

(72) Inventors: Steven M. Goss, Corvallis, OR (US); Gregory F. Carlson, Corvallis, OR (US); Phillip Salvatori, Salem, OR (US); James Mealy, Oviedo, FL (US)

(73) Assignee: Marvell International Ltd., Hamilton (BM)

( * ) Notice: Subject to any disclaimer, the term of this patent is extended or adjusted under 35 U.S.C. 154(b) by 496 days.

(21) Appl. No.: 14/613,072

(22) Filed: Feb. 3, 2015

Related U.S. Application Data

(60) Provisional application No. 61/935,662, filed on Feb. 4, 2014.

(51) Int. Cl.
| | | |
|---|---|---|
| *B29C 67/00* | (2017.01) | |
| *B29C 64/106* | (2017.01) | |
| *B29C 64/393* | (2017.01) | |
| *B29C 64/118* | (2017.01) | |
| *B29C 64/112* | (2017.01) | |
| *B33Y 10/00* | (2015.01) | |
| *B33Y 30/00* | (2015.01) | |
| *B29L 31/00* | (2006.01) | |
| *B33Y 50/02* | (2015.01) | |

(52) U.S. Cl.
CPC ........ *B29C 67/0055* (2013.01); *B29C 64/106* (2017.08); *B29C 64/112* (2017.08); *B29C 64/118* (2017.08); *B29C 64/393* (2017.08); *B29C 67/0088* (2013.01); *B29L 2031/772* (2013.01); *B33Y 10/00* (2014.12); *B33Y 30/00* (2014.12); *B33Y 50/02* (2014.12)

(58) Field of Classification Search
CPC ... B29C 64/106; B29C 64/112; B29C 64/118; B29C 64/393
USPC ....... 264/40.1, 113, 308, 406, 408, 409, 410
See application file for complete search history.

(56) References Cited

U.S. PATENT DOCUMENTS

| | | | | |
|---|---|---|---|---|
| 5,622,216 | A * | 4/1997 | Brown | B33Y 10/00 164/71.1 |
| 2006/0111807 | A1* | 5/2006 | Gothait | B29C 67/0059 700/119 |
| 2013/0313743 | A1* | 11/2013 | Rockhold | B29C 67/0055 264/40.1 |
| 2015/0352839 | A1* | 12/2015 | Folkins | B29C 67/0059 347/14 |

\* cited by examiner

*Primary Examiner* — Leo B Tentoni

(57) ABSTRACT

Embodiments include a method of fabricating a three-dimensional (3D) object using a 3D printing system, wherein the 3D printing system controls one or more parameters of the 3D printing system to fabricate the 3D object, the method comprising: sensing a characteristic of a component of the 3D printing system, wherein the characteristic of the component of the 3D printing system changes over time; and based on sensing a change in the characteristic of the component of the 3D printing system, calibrating a first parameter of the one or more parameters used to fabricate the 3D object.

9 Claims, 4 Drawing Sheets

METHOD FOR CONTROLLING PRINTING IN THREE-DIMENSIONAL PRINTERS BASED ON NOZZLE CHARACTERISTICS

CROSS REFERENCE TO RELATED APPLICATIONS

This claims priority to U.S. Provisional Patent Application No. 61/935,662, filed on Feb. 4, 2014, which is incorporated herein by reference in its entirety.

TECHNICAL FIELD

Embodiments of the present disclosure relate to three-dimensional (3D) printing, and in particular to controlling the printing process of a 3D printer based on characteristics associated with one or more features or components of the 3D printer.

BACKGROUND

Additive manufacturing technology enables computer designs, such as computer-aided design (CAD) files, to be fabricated into three dimensional (3D) objects. Additive manufacturing, also known as 3D printing, typically comprises depositing, curing, fusing, or otherwise forming a material into sequential cross-sectional layers of the 3D object. The fabrication of a 3D object is achieved using additive processes. Thus, an object is created by laying down successive layers of material until the entire object is created. Each of these layers can be seen as a thinly sliced horizontal cross-section of the eventual object.

In a 3D printer, one or more nozzles are typically used to deposit printing material on a build platform to fabricate a 3D object. Over time, a nozzle generally undergoes wear and tear. For example, a size and/or shape of an opening of a nozzle can change over time due to wear and tear. Such change in the size and/or shape of the opening of a nozzle can have undesirable effects on the flow of printing material through the opening of the nozzle, and can also adversely affect the 3D printing process.

SUMMARY

In various embodiments, the present disclosure provides a method of fabricating a three-dimensional (3D) object using a 3D printing system, wherein the 3D printing system controls one or more parameters of the 3D printing system to fabricate the 3D object, the method comprising: sensing a characteristic of a component of the 3D printing system, wherein the characteristic of the component of the 3D printing system changes over time; and based on sensing a change in the characteristic of the component of the 3D printing system, calibrating a first parameter of the one or more parameters used to fabricate the 3D object.

In various embodiments, the present disclosure also provides an apparatus for fabricating a three-dimensional (3D) object from a digital representation of the object stored in a computer readable media, the apparatus comprising: a print mechanism configured to, based on one or more parameters of the apparatus, deposit printing material for fabrication of the 3D object; a sensor configured to sense a characteristic of a component of the apparatus, wherein the characteristic of the component of the apparatus changes over time; and a module configured to, based on the sensor sensing a change in the characteristic of the component, calibrate a first parameter of the one or more parameters used to fabricate the 3D object.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
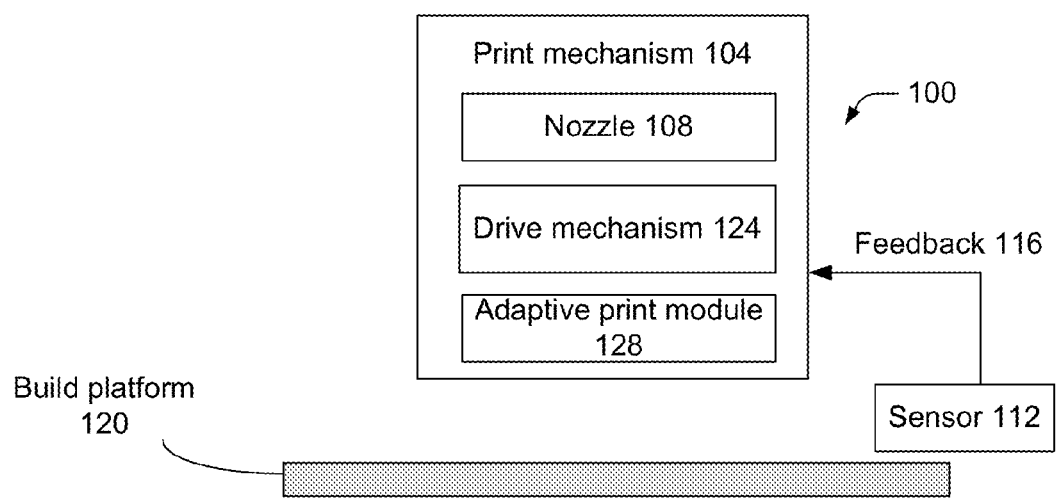
FIG. 1 schematically illustrates a system for adaptively fabricating a 3D object from a digital representation of the 3D object.

FIG. 1 schematically illustrates a system 100 for adaptively fabricating a 3D object from a digital representation of the 3D object. In one embodiment, the system 100 comprises a 3D printing system (e.g., a 3D printer). The system 100 comprises a build platform 120 (also commonly referred to as a "build plate"), and a print mechanism 104 disposed above the build platform 120. In an embodiment, the print mechanism 104 is configured to deposit printing material on the build platform 120, to fabricate the 3D object on the build platform 120.

The print mechanism 104 receives a digital representation of the 3D object to be fabricated (e.g., from a computer readable storage media, e.g., a memory, not illustrated in FIG. 1). The print mechanism 104 is configured to fabricate the 3D object on the build platform 120, e.g., by selectively depositing layers of printing material on the build platform 120.

The print mechanism 104 comprises a nozzle 108, through which printing material is deposited on the build platform 120. Although only one nozzle 108 is illustrated in FIG. 1, in other embodiments (and although not illustrated in FIG. 1), the system 100 can also include more than one nozzle.

The print mechanism 104 comprises a drive mechanism 124 to drive the nozzle 108 over the build platform 120. While the nozzle 108 is being driven by the drive mechanism 124 over the build platform 120, printing material is deposited via the nozzle 108 (e.g., via an opening in the nozzle 108) on the build platform 120, to fabricate the 3D object on the build platform 120.

In an embodiment, the system 100 further comprises a sensor 112 configured to sense one or more characteristics of the nozzle 108. The sensor 112 provides feedback 116 to the print mechanism 104. The feedback 116 comprises information associated with the one or more characteristics of the nozzle 108, as sensed by the sensor 112.

The print mechanism 104 comprises an adaptive print module 128 (also referred to herein as "module 128"). In an embodiment, the module 128 receives the feedback 116. In an embodiment, based on the feedback 116, the print mechanism 104 (e.g., the module 128) is configured to adaptively control the printing or fabrication of the 3D object. For example, the module 128 adaptively controls one or more configuration parameters of the system 100 and/or operating conditions of the system 100, based on the one or more characteristics of the nozzle 108 sensed by the sensor 112, as will be discussed in detail herein later. In an example, the module 128 adaptively compensates for any wear and tear of an opening of the nozzle 108, while the print mechanism 104 deposits printing material via the nozzle 108 to fabricate the 3D object, as will be discussed in detail herein later.

Figure 2:
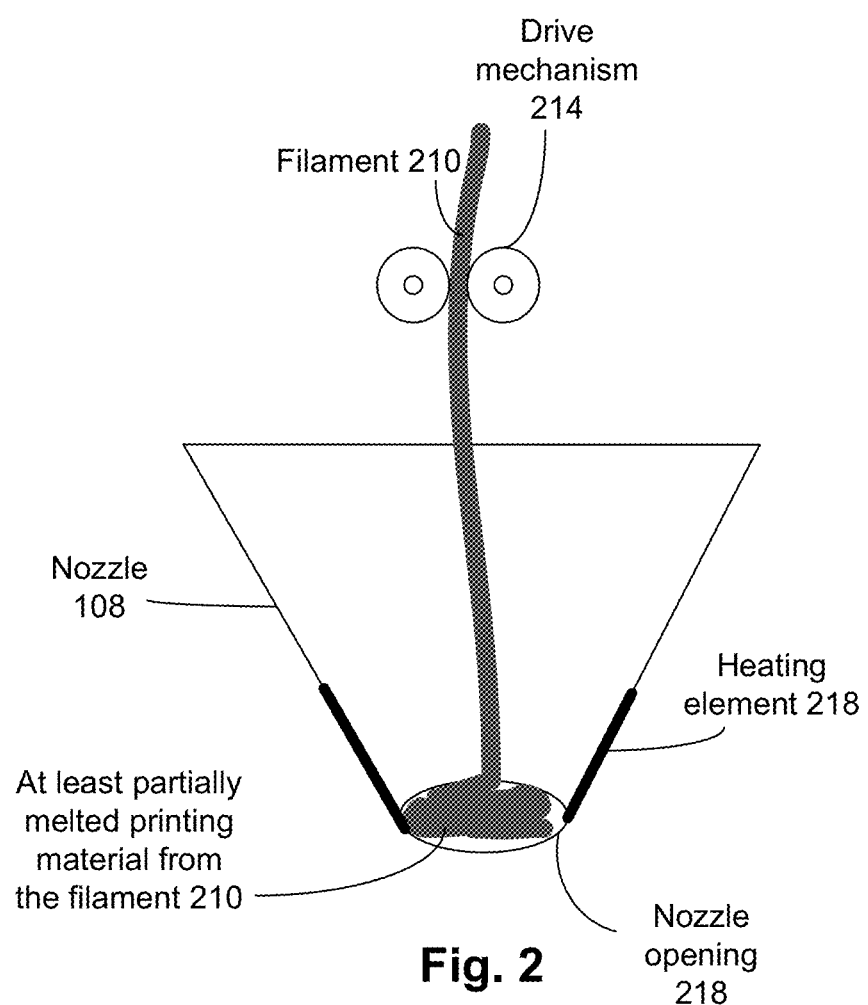
FIG. 2 schematically illustrates an example implementation of a nozzle of the system of FIG. 1.

FIG. 2 schematically illustrates an example implementation of the nozzle 108 of FIG. 1. In the example implementation of FIG. 2, the nozzle 108 receives a filament 210. A filament is, for example, a tubular or wire-like strip of printing material that is eventually deposited by a nozzle while fabricating a 3D object. The filament 210 comprises any appropriate material used for 3D printing, e.g., polymers, plastic, nylon, etc.

In an embodiment, the nozzle 108 comprises heating element 218 configured to heat the filament 210 as the filament 210 is driven through the nozzle 108. Although the heating element 218 is illustrated in FIG. 2 to be mounted on sidewalls of a lower part of the nozzle 108, in another embodiment, the heating element 218 can have any different shape, size, configuration and/or position. In an embodiment, the heating element 218 can be external to the nozzle 108 (e.g., placed proximally to the nozzle 108).

In an embodiment, the nozzle 108 receives the filament 210, and the filament 210 is heated using the heating element 218 (or using any other appropriate heating arrangement not illustrated in FIG. 2). As a result, the filament 210 at least partially melts. The nozzle 108 has an opening 218 on one end. The at least partially melted filament 210 is deposited through the opening 218 of the nozzle 108, while the 3D object is being fabricated on the build platform 120.

In an embodiment, the filament 210 is driven through the nozzle 108, while the nozzle 108 deposits printing material over the build platform 120 to fabricate the 3D object. For example, the system 100 comprises drive mechanism 214 to drive the filament 210 through the nozzle 108. The example of FIG. 2 illustrates the drive mechanism 214 comprising two rollers, although the drive mechanism 214 can include one or more other appropriate components (e.g., comprising motors, gears, cams, clutches, etc.) to drive the filament 210 through the opening 218 of the nozzle 108.

FIG. 2 illustrates an example configuration and position of the drive mechanism 214, although the drive mechanism 214 can have any other configuration, shape, size, etc., and can be placed at any other location relative to the nozzle 108.

Although FIG. 2 illustrates a single filament 210 being driven through the nozzle 108, in another embodiment (and although not illustrated in FIG. 2), more than one filaments can be received at the nozzle 108, and one of the more than one filaments can be selected and driven through the opening 218.

In an embodiment, the opening 218 is, for example, circular. For example, the opening 218 is manufactured to have a circular shape and a specific size. However, over time and with repeated use, the shape and/or the size of the opening 218 may change. For example, friction between the printing material (e.g., generated by at least partially melting the filament 210) and the opening 218, when the printing material comes out of the opening 218, gradually wears out the opening 218 over time (e.g., increasing a diameter of the opening 218). The high operating temperature of the opening 218 and/or the printing material (e.g., when the printing material comes out of the opening 218) can also contribute to such wear of the opening 218. In a circumstance in which the diameter of the opening of a nozzle increases, over time the nozzle will permit increasingly more printing material to be driven through the opening of the nozzle unless the pressure, at which the printing material is driven through the nozzle, is adjusted. 3D printing systems generally require fine precision and control of the extrusion of printing material from a nozzle, and an increasing diameter of a nozzle can detrimentally affect the formation of a 3D object.

Figures 3A, 3B, 3C:
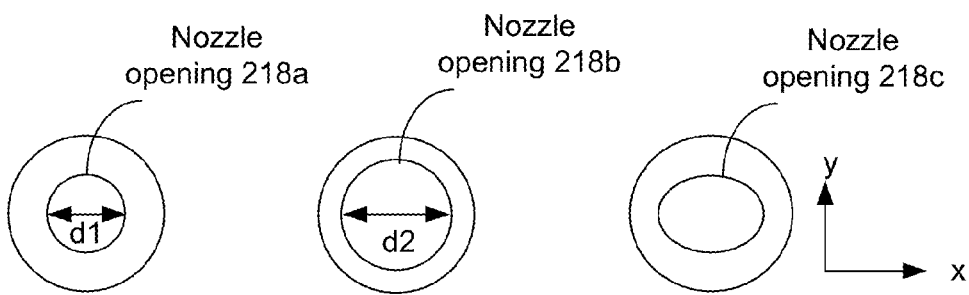
FIGS. 3A-3C illustrate example shapes and sizes of an opening of a nozzle.

FIGS. 3A-3C illustrate example shapes and sizes of an opening of a nozzle. FIG. 3A illustrates an opening 218a having a substantially circular shape and a relatively small size; FIG. 3B illustrates an opening 218b having a substantially circular shape and a relatively large size; and FIG. 3C illustrates an opening 218c having a non-circular shape.

In an embodiment, the opening 218 of FIG. 2 initially has the shape of the opening 218a of FIG. 3A, e.g., while the nozzle 108 is manufacturer or during an initial period of use of the nozzle 108. However, with repeated use, the opening 218 wears out and can take a shape and/or a size of one of the example openings 218b or 218c of FIGS. 3B and 3C, respectively.

In an example, if the wear and tear of the opening 218 is even on each side of the opening 218, the size of the opening 218 increases, e.g., without substantially changing the circular shape of the opening 218. For example, the opening 218b of FIG. 3B has a larger size compared to the opening 218a of FIG. 3A, although both the openings 218a and 218b have somewhat similar circular shapes. For example, the opening 218a has an opening of dimension d1 (e.g., a diameter of the circular shaped opening 218a is d1), while the opening 218b has an opening of dimension d2 (e.g., a diameter of the circular shaped opening 218b is d2), where d2 is larger than d1.

In another example, if the wear and tear of the opening 218 is uneven on each side of the opening 218, the shape of the opening 218 changes with time, with potential increase in the size of the opening 218 as well. For example, the opening 218c of FIG. 3C has a different shape compared to the opening 218a of FIG. 3A. The opening 218c of FIG. 3C has, for example, an elliptical shape (although the opening 218c can have any other non-circular shape). For example, the opening 218c of FIG. 3C has a relatively larger dimension along the X axis, compared to a dimension of the opening 218c along the Y axis.

As previously discussed, the sensor 112 senses one or more characteristics of the nozzle 108. In an embodiment, the sensor 112 senses one or more characteristics of the opening 218 of the nozzle 108. For example, the sensor 112 senses a shape and/or a size of the opening 218 of the nozzle 108.

In an embodiment, the sensor 112 comprises an optical sensor that can sense the shape and/or the size of the opening 218 of the nozzle 108. In an example, the sensor 112 comprises a camera that takes picture and/or video of the nozzle 108, including the opening 218 of the nozzle 108. The picture and/or video can be analyzed (e.g., by the module 128, or by a different module not illustrated in the figures) to determine a shape and/or a size of the opening 218 of the nozzle 108. In an example, the camera can also be used for one or more other purposes (e.g., to take pictures and/or video of the 3D object, as the 3D object is being fabricated by the system 100). In an example, the camera is used for measuring and/or monitoring an amount of printing material dispensed by the nozzle 108. In an example, measuring and/or monitoring the amount of printing material dispensed by the nozzle 108, at a specific pressure and/or a specific temperature (i.e., at specific operating parameters of the system 100) provides an estimation of a shape and/or a size of the opening 218 of the nozzle 108 (e.g., provides an indication of an extent of wear and tear in the opening 218 of the nozzle 108).

Figure 4:
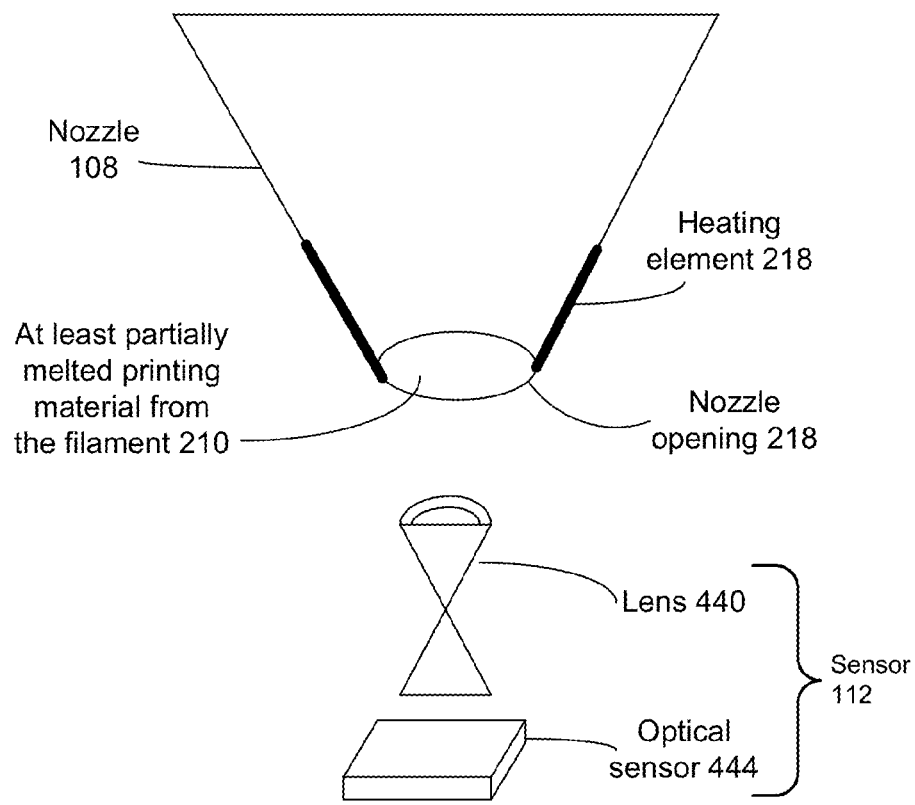
FIG. 4 schematically illustrates an example implementation of a sensor.

As an example, FIG. 4 schematically illustrates an example implementation of the sensor 112. In the example of FIG. 4, the sensor 112 comprises a lens 440 and an optical sensor 444. The optical sensor 444 receives reflection of the opening 218 of the nozzle 108 through the lens 440, and captures a picture of the opening 218 of the nozzle 108.

In another example, the sensor 112 comprises a laser scanner. For example, the laser scanner comprises a laser generation unit (not illustrated in the figures) that generates one or more laser beams. The laser beams are reflected on the opening 218, and received by a receiver (not illustrated in the figures) of the laser scanner. Based on analyzing the reflection of the laser beams from the opening 218, a shape and/or a size of the opening 218 are determined.

In another example, the sensor 112 can be of any appropriate type, e.g., any appropriate sensor that can sense a shape and/or a size of the opening 218 (or sense any other characteristics of the nozzle 108).

As previously discussed herein with respect to FIG. 1, the sensor 112 provides feedback 116 to the print mechanism 104. The feedback 116 comprises information associated with the one or more characteristics of the nozzle 108 (e.g., one or more characteristics of the opening 218 of the nozzle 108), as sensed by the sensor 112. In an embodiment, based on the feedback 116, the print mechanism 104 (e.g., the module 128) adaptively controls the printing or fabrication of the 3D object.

For example, based on the feedback 116, the print mechanism 104 controls a speed and/or a rate with which the printing material is deposited by the nozzle 108, a speed with which the nozzle 108a is driven over the building platform 120 (e.g., while the nozzle 108a deposits printing material over the building platform 120), heating pattern with which the filament 210 is heated, a type of printing material (i.e., a type of the filament 210) that is to be used for fabricating the 3D object, a height of the opening 218 from the build platform 120 (e.g., while the 3D object is being fabricated), a pressure with which the printing material is being driven out of the opening 218, a number of pass required to build a layer of the 3D object, a manner by which the filament 210 is driven by the drive mechanism 214, and/or the like.

As an example, assume that when the opening 218 has a shape that is similar to the shape of opening 218a of FIG. 3A (e.g., when the nozzle 108 is new, and/or has not undergone significant wear and tear), as the nozzle 108 deposits printing material over the build platform 120, the nozzle 108 is operated under a first operating conditions. When the nozzle 108 is operated under the first operating conditions, for example, (i) the nozzle 108 is driven over the build platform 120 at a first speed by the drive mechanism 124, (ii) the filament 210 is driven at a first rate through the nozzle 108 by the drive mechanism 214, (iii) the filament 210 is heated by the heating element 218 using a first amount of heat (e.g., such that the filament 210 is at a first temperature near the opening 218), (iv) the at least partially melted printing material from the filament 210 is at a first pressure that results in the at least partially melted printing material coming out of the opening 218, and/or (v) a first type of material is used as the filament 210. Operating the nozzle 108 under the first operating conditions results in the fabrication of at least a layer of the 3D object at a first rate.

However, over time, the opening 218 wears out and the shape of the opening 218 becomes similar to the shape of the opening 218b of FIG. 3B (or similar to the shape of the opening 218c of FIG. 3C). Thus, if the nozzle 108 is still operated under the same first operating conditions, the increased size of the opening 218 will result in more printing material being deposited, thereby resulting in the fabrication of at least the layer of the 3D object at a second rate that is higher than the first rate. Unless the operating conditions are changed and/or the printing process is re-calibrated to compensate for the change in the opening 108, this may create undesirable effects in the fabricated 3D object.

The calibration of the operating conditions of the nozzle 108 and/or the printing process can be achieved in one or more of a variety of manners, some of which are discussed below.

As example, to at least in part compensate for the increase in the size of the opening 218, the nozzle 214 is driven over the build platform 120 at a second speed by the drive mechanism 124, where the second speed is faster than the first speed. Driving the nozzle 108 relatively faster over the build platform 120 results in the nozzle 108 spending less time over a specific location of the build platform 120. Accordingly, even though the rate at which the printing material comes out of the opening 218 increases (e.g., due to the increase in size of the opening 218), an amount of printing material deposited over the specific location of the build platform 120 does not change significantly (i.e., at least in part compensates for the increase in the size of the opening 218).

Additionally or alternatively, to at least in part compensate for the increase in the size of the opening 218, the filament 210 is driven at a second rate through the nozzle 108 by the drive mechanism 214, where the second rate is slower than the first rate. Driving the filament 210 through the nozzle 108 at a relatively slower rate at least in part compensates for the increase in the size of the opening 218.

Additionally or alternatively, to at least in part compensate for the increase in the size of the opening 218, the filament 210 is heated by the heating element 218 using a second amount of heat (e.g., such that the filament 210 is at a second temperature near the opening 218), where the second amount of heat is less than the first amount of heat. Heating the filament 210 using less heat results in the filament 210 being relatively more viscous (i.e., results in less melting of the filament 210), thereby reducing a rate at which the at least partially melted printing material from the filament 210 comes out of the opening 218, thereby at least in part compensating for the increase in the size of the opening 218 of the nozzle 108.

Additionally or alternatively, to at least in part compensate for the increase in the size of the opening 218, the at least partially melted printing material from the filament 210 is at a second pressure that results in the at least partially melted printing material coming out of the opening 218, where the second pressure is less than the first pressure. Exerting less pressure on the at least partially melted printing material from the filament 210 reduces a rate at which the at least partially melted printing material from the filament 210 comes out of the opening 218, thereby at least in part compensating for the increase in the size of the opening 218.

Additionally or alternatively, to at least in part compensate for the increase in the size of the opening 218, a second type of material is used as filament 210, where the second type of material is different from the first type of material. The second type of material, for example, is more viscous than the first type of material, e.g., when both the first and second type of material are heated at a given temperature and at least partially melted. Using the second type of material (which, for example, is more viscous than the first type of material) reduces a rate at which the at least partially melted printing material from the filament 210 comes out of the opening 218, thereby at least in part compensating for the increase in the size of the opening 218.

Additionally or alternatively, to at least in part compensate for the increase in the size of the opening 218, a distance between the opening 218 and the build platform 120 is adjusted. In an example, the deposition of the printing material on the build platform 120 is based at least in part on the distance between the opening 218 and the build platform 120. For example, if the distance between the opening 218 and the build platform 120 is relatively less, then the at least partially melted printing material from the opening 218 is smeared or spread relatively wider while getting deposited on the build platform 120 (e.g., the smearing is based on a feed rate of the filament 210). In another example, if the distance between the opening 218 and the build platform 120 is relatively higher, then the at least partially melted printing material more closely approaches the diameter of the opening 218 while getting deposited on the build platform 120 (e.g., based on the feed rate of the filament 210). Thus, in an example, if the size of the opening 218 gets bigger, raising the height of the opening 218 relative to the build platform 120 at least in part compensates for the increase in the size of the opening 218.

Referring again to FIG. 3C, the opening 218c has a non-circular shape, and has an opening that is larger size in the direction of the X axis (also referred to as "x direction"), compared to the size of the opening in the direction of the Y axis (also referred to as "y direction"). As a result, if the nozzle 108 is driven along the x direction over the build platform 120 (e.g., by the drive mechanism 124), a swath of printing material deposited by the nozzle 108 will be narrower compared to a swath of printing material deposited by the nozzle 108 while the nozzle 108 is driven along the y direction over the build platform 120.

Accordingly, assume that while fabricating a layer of 3D object, the layer has a specific width. If the shape of the opening of the nozzle 108 is similar to the shape of the opening 218a, assume a first number of passes of the nozzle 108 is required to achieve that specific width of the layer (that is, the nozzle 108 has to repeat depositing the printing material the first number of times of achieve the specific width of the layer). Also, assume that the shape of the opening of the nozzle 108 is similar to the shape of the opening 218c and the layer is to be deposited in the x direction—in such a case, a second number of passes is required to achieve that specific width of the layer, where the second number is higher than the first number (e.g., as the swath of printing material deposited by the opening 218c in the x direction is narrower compared to a swath of printing material deposited by the opening 218a). On the other hand, assume that the shape of the opening of the nozzle 108 is similar to the shape of the opening 218c and the layer is to be deposited in the y direction—in such a case, a third number of passes is required to achieve that specific width of the layer, where the third number is lower than each of the first and second numbers (e.g., as the swath of printing material deposited by a nozzle having an opening that is similar to the shape of the opening 218c in the y direction is wider compared to the swath of printing material deposited by a nozzle having an opening that is similar to the shape of the opening 218a).

In addition to controlling the number of passes, various other operating parameters of the nozzle 108 can also be adjusted to compensate for the non-circular shape of the opening 218c. For example, to compensate for the non-circular shape of the opening 218c and assuming that the nozzle 108 has the opening 218c, a speed of the nozzle 108 over the build platform 120 is relatively higher if the nozzle 108 travels along the y direction (e.g., compared to a speed of the nozzle 108 over the build platform 120, if the nozzle 108 travels along the x direction). Additionally or alternatively, in an example, a rate of driving the filament 210 through the nozzle 108 by the drive mechanism 214 is relatively higher if the nozzle 108 travels along the x direction (e.g., compared to a rate of driving the filament 210 through the nozzle 108 by the drive mechanism 214 if the nozzle 108 travels along the y direction). Additionally or alternatively, in an example, a temperature at which the filament 210 is heated is relatively higher if the nozzle 108 travels along the x direction (e.g., compared to a temperature at which the filament 210 is heated if the nozzle 108 travels along the y direction). Additionally or alternatively, in an example, a pressure applied to extract the at least partially melted printing material out of the opening 218 is relatively higher if the nozzle 108 travels along the x direction (e.g., compared to a pressure applied to extract the at least partially melted printing material out of the opening 218 if the nozzle 108 travels along the y direction).

In practice, the nozzle 108 may travel in a direction that is in between the x and y directions. In such a case, the above discussed operating characteristics and the number of passes can be interpolated, e.g., based on the actual direction the nozzle 108 is travelling, as will be readily understood by those skilled in the art, based on the teachings of the disclosure.

In an embodiment, compensating for a change in a shape and/or a size of the opening 218) is performed if such a change exceeds a threshold value. For example, in response to determining that the change in the shape and/or the size of the opening 218 has exceeded a certain percentage (e.g., relative to the original shape and/or the size of the opening 218), one or more of the above discussed compensation processes are performed to compensate for such a change.

In an embodiment, the feedback 116 is also used to notify a user of the system 100 about a current condition of the opening 218. For example, if the opening 218 has deformed significantly due to wear and tear (e.g., the dimensions of the opening 218 has changed beyond a threshold limit), the user is notified and advised to replace the nozzle. In an embodiment, a display of the system 100 (not illustrated in FIG. 1) displays such a notification. In an example, a current shape and size of the opening 218 are displayed on the display. In an example, the current shape and size of the opening 218 are displayed on the display, along with the original or recommended shape and size of the opening 218 (e.g., to enable the user to readily understand or visualize the deformation of the opening 218).

In an embodiment, the sensor 112 periodically senses the one or more characteristics of the nozzle 108. In an example, before initiation of fabrication of a 3D object, the sensor 112 senses the one or more characteristics of the nozzle 108. In another example, the sensor 112 periodically senses the one or more characteristics of the nozzle 108, e.g., once every week, once every month, once every day, or the like. In another example, the sensor 112 senses the one or more characteristics of the nozzle 108, e.g., whenever prompted by a user. In another example, the sensor 112 senses the one or more characteristics of the nozzle 108, e.g., when the nozzle 108 is taken offline for maintenance (e.g., when the nozzle 108 is cleaned, to purge the nozzle 108 of any residue printing material from a previous print job).

In an embodiment, the sensor 112 can be placed at any appropriate location in the system 100. For example, the sensor 112 is placed at a location from which the sensor 112 has a view of the opening 218. As an example, the sensor 112 is placed external to the build platform 120, and the nozzle 108 is brought above the sensor 112 (e.g., by the drive mechanism 124), to enable the sensor 112 to sense the one or more characteristics of the nozzle 108.

Figure 5:
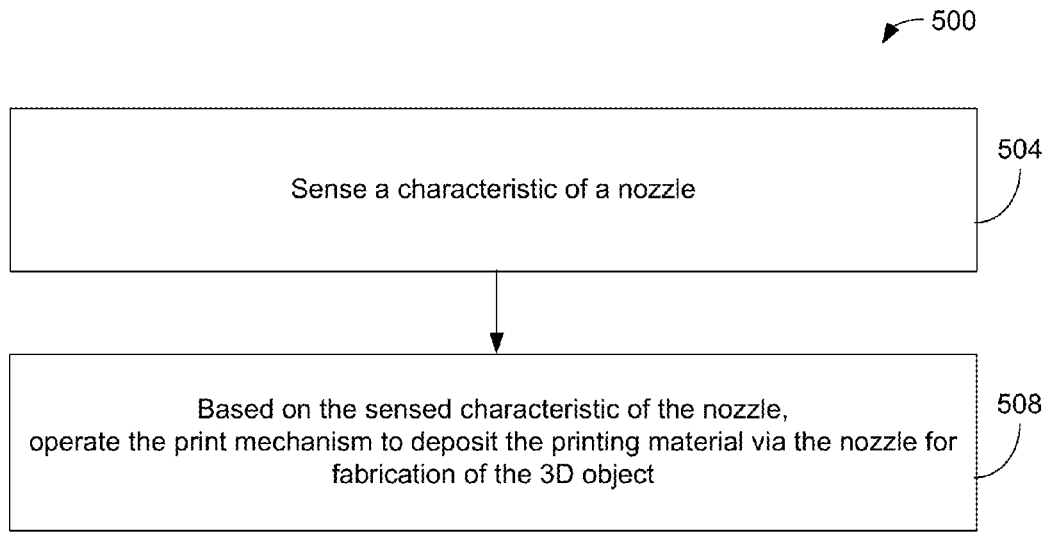
FIG. 5 is a flow diagram of an example method for adaptively fabricating a 3D object from a digital representation of the 3D object.

FIG. 5 is a flow diagram of an example method 500 for adaptively fabricating a 3D object from a digital representation of the object. At 504, a characteristic of a nozzle (e.g., the nozzle 108) is sensed (e.g., by the sensor 112). In an example, the characteristic of the nozzle comprises a characteristic (e.g., one of a size or a shape) of an opening of a nozzle (e.g., opening 218). At 508, based on the sensed characteristic of the nozzle, a print mechanism (e.g., the print mechanism 104) is operated to deposit printing material via the nozzle for fabrication of the 3D object.

Figure 6:
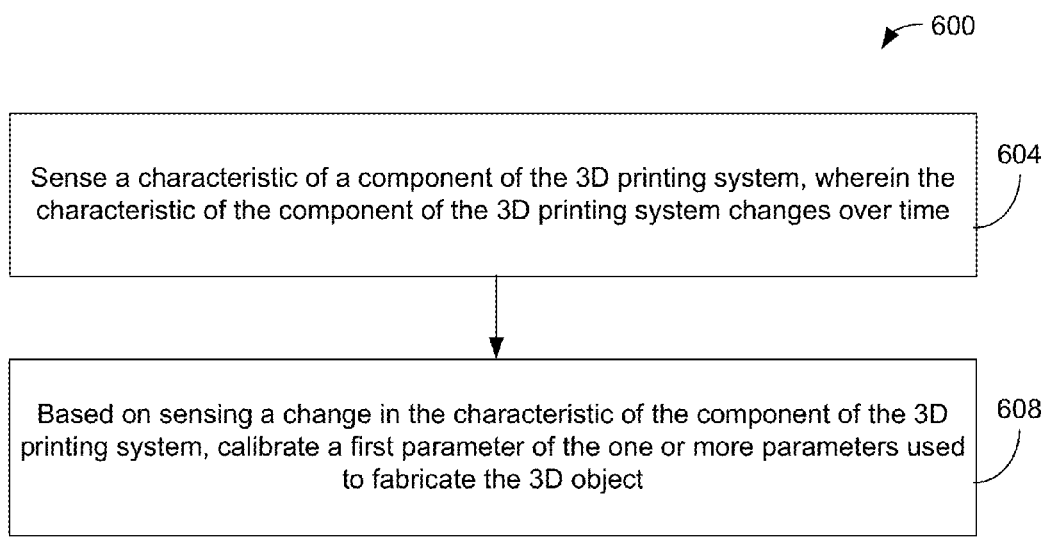
FIG. 6 is a flow diagram of another example method for adaptively fabricating a 3D object from a digital representation of the 3D object

FIG. 6 is a flow diagram of another example method 600 for adaptively fabricating a 3D object from a digital representation of the object using a 3D printing system (e.g., the system 100 of FIG. 1). In an embodiment, the 3D printing system controls one or more parameters of the 3D printing system to fabricate the 3D object. At 604, a characteristic of a component (e.g., a shape and/or a size of the opening 218 of the nozzle 108) of the 3D printing system is sensed (e.g., by the sensor 112). In an embodiment, the characteristic of the component of the 3D printing system changes over time. At 608, based on sensing a change in the characteristic of the component of the 3D printing system, a first parameter (e.g., a speed with which the nozzle is driven over a build platform, a rate with which the printing material is driven through the nozzle, a temperature at which the printing material is heated prior to being deposited via the nozzle, a distance between an opening of the nozzle and the build platform, or the like) of the one or more parameters used to fabricate the 3D object is calibrated (e.g., by the module 128).

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. For example, although embodiments discussed above are generally described in connection with adjusting one or more parameters of a 3D printing system based on sensing wear and tear associated with a nozzle—such parameters can be adjusted based on sensing change in any other component associated with a 3D printing system that may change over time. Such components can include, for example, the build platform 120, the heating element 218, and/or the like. For example, any wear and tear in the build platform 120 over time can be sensed (e.g., using a camera, a level gauge, or by any other appropriate means), and such information can be used to adjust or calibrate one or more parameters of the 3D printing system to compensate for the wear and tear in the build platform 120. This application is intended to cover any adaptations or variations of the embodiments discussed herein. Therefore, it is manifestly intended that embodiments in accordance with the present invention be limited only by the claims and the equivalents thereof.

What is claimed is:

1. A method of fabricating a three-dimensional (3D) object using a 3D printing system, wherein the 3D printing system controls one or more parameters of the 3D printing system to fabricate the 3D object, the method comprising:
   sensing a characteristic of a component of the 3D printing system, wherein the characteristic of the component of the 3D printing system changes over time; and
   based on sensing a change in the characteristic of the component of the 3D printing system, calibrating a first parameter of the one or more parameters used to fabricate the 3D object,
   wherein the component of the 3D printing system comprises a nozzle, wherein the nozzle has an opening through which printing material is deposited while fabricating the 3D object, and wherein sensing the characteristic of the component comprises
      sensing a characteristic of the opening of the nozzle, wherein the characteristic of the opening of the nozzle comprises one or both of (i) a shape of the opening of the nozzle or (ii) a size of the opening of the nozzle.

2. The method of claim 1, wherein sensing the characteristic of the nozzle comprises:
   using one of an optical sensor or a laser scanner to sense the characteristic of the nozzle.

3. The method of claim 1, wherein calibrating the first parameter of the one or more parameters further comprises:
   calibrating the first parameter of the one or more parameters to compensate for any wear and tear in the nozzle.

4. The method of claim 1, wherein calibrating the first parameter of the one or more parameters used to fabricate the 3D object further comprises:
   based at least in part on sensing the characteristic of the nozzle, controlling one of (i) a speed with which the nozzle is driven over a build platform, (ii) a rate with which the printing material is driven through the nozzle, (iii) a temperature at which the printing material is heated, prior to the printing material being deposited via the nozzle, or (iv) a distance between an opening of the nozzle and the build platform.

5. The method of claim 1, wherein the method further comprises:
   while the nozzle deposits the printing material, (i) driving the nozzle over a build platform at a first speed and at a first direction, and (ii) driving the nozzle over the build platform at a second speed and at a second direction, wherein the first direction is different from the second direction,
   wherein calibrating the first parameter of the one or more parameters used to fabricate the 3D object further comprises based at least in part on sensing that at least the shape of the opening of the nozzle has changed to a non-circular shape, controlling the first speed and the second speed such that the first speed is different from the second speed.

6. The method of claim 1, wherein the characteristic of the nozzle comprises at least a shape of an opening of the nozzle, and wherein the method further comprises:
while driving the nozzle over a build platform at a first direction, operating the nozzle under first operating conditions; and
while driving the nozzle over the build platform at a second direction, operating the nozzle under second operating conditions, wherein the first direction is different from the second direction,
wherein calibrating the first parameter of the one or more parameters used to fabricate the 3D object further comprises
based at least in part on sensing that the shape of the opening of the nozzle has changed to a non-circular shape, controlling the first operating conditions and the second operating conditions such that one or more conditions of the first operating conditions are different from one or more corresponding conditions of the second operating conditions.

7. The method of claim 1, further comprising:
determining that the sensed change in the characteristic of the nozzle exceeds a threshold value; and
based at least in part on determining that the sensed change in the characteristic of the nozzle exceeds the threshold value, providing a notification notifying that the sensed change in the characteristic of the nozzle exceeds the threshold characteristic.

8. The method of claim 1, further comprising:
determining that the sensed change in the characteristic of the nozzle exceeds a threshold value; and
based at least in part on determining that the sensed change in the characteristic of the nozzle exceeds the threshold value, providing a notification recommending that the nozzle be replaced with a new nozzle.

9. The method of claim 1, wherein calibrating the first parameter of the one or more parameters used to fabricate the 3D object further comprises:
determining that the sensed change in the characteristic of the component exceeds a threshold value; and
based at least in part on determining that the sensed change in the characteristic of the component exceeds the threshold value, calibrating the first parameter of the one or more parameters used to fabricate the 3D object.

* * * * *